United States Patent
Lang et al.

(10) Patent No.: US 9,926,970 B2
(45) Date of Patent: Mar. 27, 2018

(54) JOINT DEVICE FOR PIVOTALLY CONNECTING A MIRROR TO A VEHICLE

(71) Applicant: Mekra Lang GmbH & Co. KG, Ergersheim (DE)

(72) Inventors: Werner Lang, Ergersheim (DE); Georg Hecht, Weihenzell (DE); Albrecht Popp, Weihenzell (DE); Markus Pauly, Bad Windsheim (DE)

(73) Assignee: Mekra Lang GmbH & Co. KG, Ergersheim (DE)

( * ) Notice: Subject to any disclaimer, the term of this patent is extended or adjusted under 35 U.S.C. 154(b) by 0 days.

(21) Appl. No.: 14/973,297

(22) Filed: Dec. 17, 2015

(65) Prior Publication Data

US 2016/0102702 A1 Apr. 14, 2016

Related U.S. Application Data

(63) Continuation-in-part of application No. PCT/EP2014/063140, filed on Jun. 23, 2014.

(30) Foreign Application Priority Data

Jun. 26, 2013 (DE) .......................... 10 2013 212 339
Jun. 28, 2013 (DE) .......................... 10 2013 212 769

(51) Int. Cl.
*B60R 1/00* (2006.01)
*F16C 11/04* (2006.01)
(Continued)

(52) U.S. Cl.
CPC ................ *F16C 11/04* (2013.01); *B60R 1/00* (2013.01); *B60R 1/06* (2013.01); *B60R 1/076* (2013.01);
(Continued)

(58) Field of Classification Search
USPC ....... 248/475.1, 476, 477, 478, 488, 220.21, 248/220.22, 221.11, 222.11, 222.12,
(Continued)

(56) References Cited

U.S. PATENT DOCUMENTS 4,728,181 A  3/1988 Kakinuma .................... 350/632
5,120,015 A * 6/1992 do Espirito Santo . B60R 1/0617
248/479
(Continued)

FOREIGN PATENT DOCUMENTS

CN  102149572 A  8/2011
DE  4126523 A1  2/1993
(Continued)

OTHER PUBLICATIONS

Office action dated Nov. 1, 2016, from the Chinese Patent Office in the related foreign application CN201480034592.7 (9 pages).
(Continued)

*Primary Examiner* — Alfred Wujciak
(74) *Attorney, Agent, or Firm* — Imperium Patent Works; Darien K. Wallace

(57) ABSTRACT

A swivel joint system for pivotally connecting a mirror to a vehicle includes a first arm, a second arm, a locking pin, a spring element and a centering element. The first arm has first and second bearing shells. The second arm has a first counter bearing shell and a second counter bearing shell. The counter bearing shells are disposed between the first bearing shell and the second bearing shell. A first latching surface of the first counter bearing shell contacts and presses against a second latching surface of the first bearing shell. The locking pin passes through the first bearing shell, the second bearing shell and a hole in the centering element. The second arm swivels relative to the first arm about a joint axis that is oriented co-axially to the locking pin. The spring
(Continued)

element pushes the locking pin away from the first counter bearing shell.

12 Claims, 7 Drawing Sheets

(51) Int. Cl.
*B60R 1/06* (2006.01)
*B60R 1/076* (2006.01)
*E05D 11/10* (2006.01)
*F16M 13/02* (2006.01)
*E05D 11/00* (2006.01)

(52) U.S. Cl.
CPC ......... *E05D 11/1078* (2013.01); *F16M 13/02* (2013.01); *B60R 1/006* (2013.01); *E05D 11/0081* (2013.01); *E05D 2011/1035* (2013.01)

(58) Field of Classification Search
USPC ............ 248/222.51, 222.52, 223.41, 224.51, 248/224.61; 359/871, 872, 879; 403/97, 403/91, 326, 327, 330, 349, 345, 350, 403/359.5
See application file for complete search history.

(56) References Cited

U.S. PATENT DOCUMENTS

| | | | |
|---|---|---|---|
| 5,137,247 A | 8/1992 | Lang et al. | 248/549 |
| 7,452,088 B2 * | 11/2008 | Brester | B60R 1/076 248/478 |
| 7,735,196 B2 | 6/2010 | Centmayer et al. | 16/334 |
| 8,209,816 B2 | 7/2012 | Heger et al. | 16/334 |
| 2007/0211356 A1 * | 9/2007 | Brester | B60R 1/076 359/872 |
| 2008/0310041 A1 * | 12/2008 | Sinelli | B60R 1/025 359/879 |
| 2011/0083300 A1 * | 4/2011 | Heger | B60R 1/06 16/321 |
| 2014/0111879 A1 | 4/2014 | Lang et al. | 359/877 |

FOREIGN PATENT DOCUMENTS

| | | |
|---|---|---|
| DE | 202009013767 U1 | 4/2010 |
| EP | 0139509 A2 | 5/1985 |
| EP | 0527455 A1 | 2/1993 |
| EP | 0527455 B1 | 2/1993 |
| EP | 1886873 B1 | 12/2010 |
| EP | 2331367 B1 | 11/2012 |
| ES | 2080645 A2 | 2/1996 |
| WO | WO 2012/146322 A1 | 11/2012 |

OTHER PUBLICATIONS

English translation of Office action dated Nov. 1, 2016, from the Chinese Patent Office in the related foreign application CN201480034592.7 (13 pages).

Office action dated May 27, 2014, from the German Patent Office in the related foreign application DE102013212339.6 (6 pages).

Office action dated Jan. 2, 2017, from the Korean Patent Office in the related foreign application KR10-2015-7036106 (8 pages).

English translation of Office action dated Jan. 2, 2017, from the Korean Patent Office in the related foreign application KR10-2015-7036106 (5 pages).

* cited by examiner

JOINT DEVICE FOR PIVOTALLY CONNECTING A MIRROR TO A VEHICLE

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2014/063140, filed on Jun. 23, 2014, and published as WO 2014/206926 A1 on Dec. 31, 2014, which in turn claims priority from German Application No. 102013212339.6, filed in Germany on Jun. 26, 2013 and from German Application No. 102013212769.3, filed in Germany on Jun. 28, 2013. This application is a continuation-in-part of International Application No. PCT/EP2014/063140, which is a continuation-in-part of German Application No. 102013212339.6 and a continuation-in-part of German Application No. 102013212769.3. International Application No. PCT/EP2014/063140 is pending as of the filing date of this application, and the United States is an elected state in International Application No. PCT/EP2014/063140. This application claims the benefit under 35 U.S.C. § 119 from German Application No. 102013212339.6 and from German Application No. 102013212769.3. The disclosure of each of the foregoing documents is incorporated herein by reference.

TECHNICAL FIELD

The invention relates to a mirror carrier for fixing an imaging device of an indirect vision system to a vehicle, particularly for a commercial vehicle. In addition, the present invention relates to such an indirect vision system that is equipped or furnished with a similar type of novel mirror carrier.

BACKGROUND

The present invention relates to a swivel joint system for a swiveling connection between a first and second articulated arm. Such a swivel joint system can be used with a mirror holder to attach a mirror to a vehicle, with one articulated arm consisting of a base piece attached to the vehicle and the other articulated arm carrying the mirror.

The German patent document DE202009013767U1 describes a swivel joint system designed as a latching hinge joint with a first articulated arm and a second articulated arm which are pivoted on a latching hinge joint axis and connected with each other in locked positions, as well as a first and a second locking pin. The first articulated arm includes two axially spaced bearing surfaces facing each other. The second articulated arm comprises a bearing block with axially opposite ends that have counter bearing surfaces pointing away from each other. One of the bearing surfaces interacts with one of the counter bearing surfaces, and the other bearing surfaces interact with the other counter bearing surfaces. The first locking pin passes axially through the interacting bearing surface and a counter bearing surface, and the second locking pin passes coaxially through the other interacting bearing and counter bearing surface. A disadvantage of this swivel joint system is that two locking pins are required, which must be fed through the (one or two) interacting bearing and counter bearing surfaces and locked independently of one another and in axially opposite directions during the assembly of the swivel joint system.

European Patent No. EP2331367B1 describes a swivel joint system in which a rotary joint has a bearing block designed on a base part with an inner cylinder wall-shaped support surface acting as a bearing, a counter bearing with a cylindrical outer wall-shaped support surface designed in the arm of the mirror and a locking pin secured in the base part, the safety catch of which is designed in the base part as a bayonet lock. A disadvantage of this swivel joint system is that the axial length of the pivot joint, in particular the axial length of the support surfaces, as compared to the length of the mirror arm, is short and the swivel joint is mainly a single-radial support with respect to its construction, so that the swivel joint has a certain radial play between the mirror arm and the base part due to the exact fit of the interacting support surfaces.

European Patent No. EP1886873B1 describes a swivel joint system with a vehicle-attached base part that has a bearing block with an axial passageway opening, and a mirror arm connected with the base part by a latching hinge joint and possessing a first support arm and a second support arm that wrap around the bearing block. The first support arm has a first counter support surface designed as a latching surface, and the second support arm has a second counter support surface as a latching surface. The swivel joint system also includes a joint axle component which is positioned in the passageway opening of the bearing block and has a first support surface designed on one axial end as a latching surface and a second support surface designed on the axially opposite end as a latching surface. The first and second support surfaces of the joint axle component are designed as latching surfaces and interact with the first and second support arm's first and second counter support surfaces designed as latching surfaces. The girthed surface of the hinge axle component forms a cylindrical outer-wall-shaped support surface, and sections of the inner wall surface of the passageway opening of the support block form complementary support surfaces with cylindrical inner walls. The joint axle component also includes a spring element positioned between the two latching surfaces. This spring element tenses the first and second support surfaces designed as latching surfaces in axially opposite directions against the support arms' first and second counter support surface designed as latching surfaces. This makes the latching hinge joint of the connected pins unnecessary. A disadvantage of this swivel joint system is that the axial length of the locking joint, in particular the axial distance between the support and counter support surfaces, compared to the length of the mirror arm, is quite short and the latching hinge joint has a certain amount of radial play between the mirror arm and the base part due to the exact fit of the interacting support and counter support surfaces.

Thus, a swivel joint system is sought with a first articulated arm and a second articulated arm connected to the first arm via a swivel joint such that the radial play between the first articulated arm and the second articulated arm is reduced or avoided.

SUMMARY

A swivel joint system for pivotally connecting a mirror to a vehicle includes a first arm, a second arm, a locking pin, a spring element and a centering element. The first arm is attached to the vehicle, and the second arm is attached to the mirror. The first arm has a first bearing shell and a second bearing shell. The second arm has a first counter bearing shell and a second counter bearing shell. The counter bearing shells are disposed between the first bearing shell and the second bearing shell. The second arm swivels relative to the first arm about a joint axis that is oriented co-axially to the locking pin.

The spring element pushes the locking pin away from the first counter bearing shell and thereby presses the counter bearing shells into the bearing shells. A first latching surface of the first counter bearing shell contacts and presses against a second latching surface of the first bearing shell. The second latching surface has catches that engage in recesses of the first latching surface. The locking pin passes through the first bearing shell, the second bearing shell and a hole in the centering element. The locking pin has a pin shaft and a conical ring collar. The centering element is disposed between the spring element and the conical ring collar. The centering element spreads out radially when pressed by the spring element onto the conical ring collar. The centering element has an opening through which the locking pin passes. A nonplanar side of the centering element is adjacent to the conical ring collar and slants away from the pin shaft at an inclination angle that corresponds to a cone angle of the conical ring collar.

Bayonet extensions are disposed at a proximal end of the pin shaft, and bayonet collar segments are disposed in a hole in the first bearing shell. The locking pin is locked to the first arm by the bayonet extensions being slid through the bayonet collar segments and undercuts of the bayonet extensions engaging the far sides of the bayonet collar segments.

In another aspect, a swivel joint system for the swiveling attachment of an external mirror to a vehicle includes first and second articulated arms. The first articulated arm has first and second bearing shells and a locking shell. The second articulated arm has an end section with a bush bearing. The bush bearing is disposed between the first and second bearing shells. The bush bearing has a first counter bearing shell that contacts the first bearing shell and a second counter bearing shell that contacts the second bearing shell. The swivel joint system also includes a locking pin with a proximal and distal end that provides for the swiveling connection of the two articulated arms. The locking pin penetrates the first bearing shell, the bush bearing and the second bearing shell and is fixed axially in the locking shell.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention. The separate figures are schematic and not necessarily drawn in corresponding scale to one another.

FIG. 7A shows a ring disc with an opening. FIG. 7B shows a ring disc with concentric, circumferential chamfers. FIG. 7C shows a ring disc with outwardly extending tongues and attached wall segments. FIG. 7D shows a ring section with tube wall segments and chambers.

DETAILED DESCRIPTION

Figure 1:
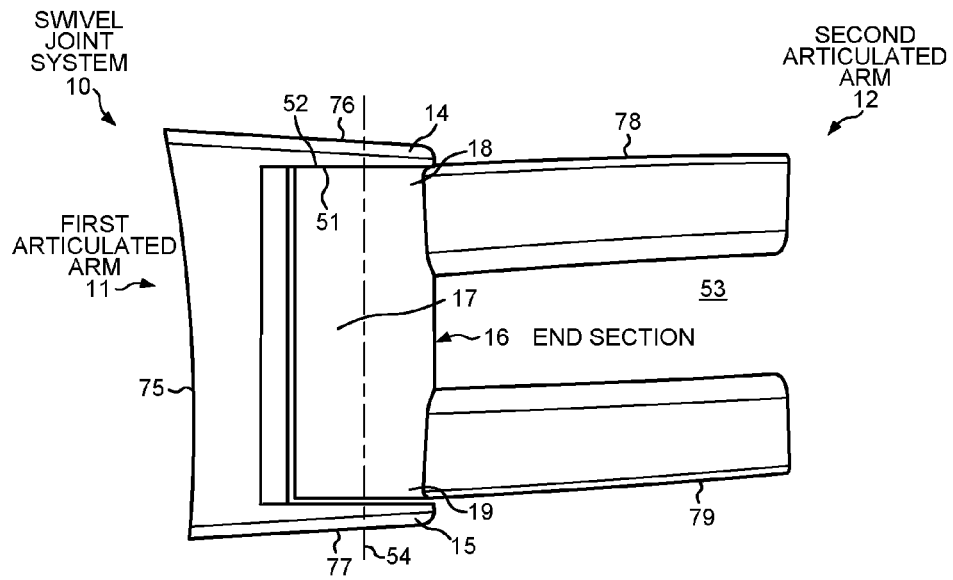
FIG. 1 is a view of a first embodiment of a swivel joint system according to the invention, particularly the frontal view for a swivel joint system attached to a vehicle.
Figure 2:
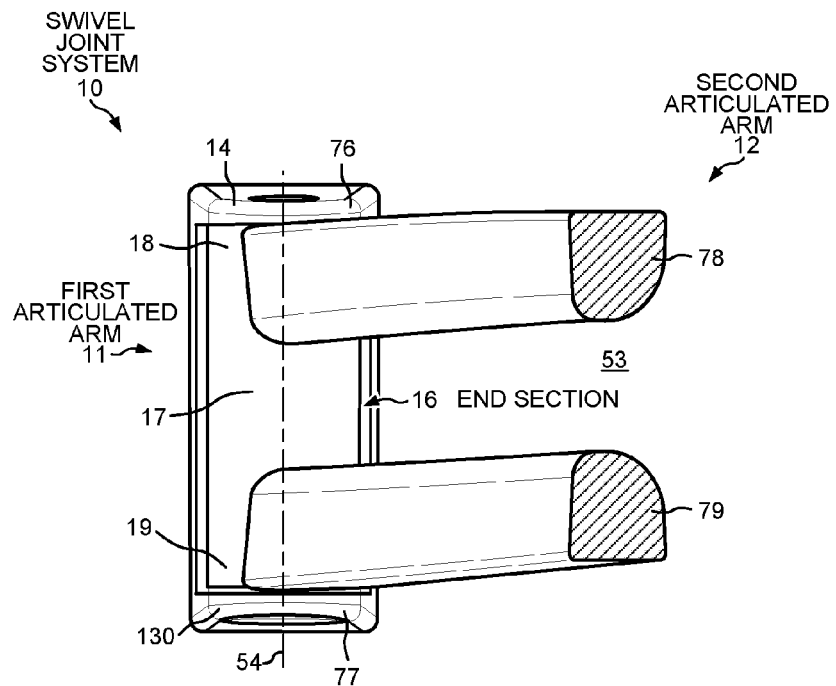
FIG. 2 is a view of the swivel joint system from the right side (in FIG. 1), looking at the swivel joint system.

Reference will now be made in detail to some embodiments of the invention, examples of which are illustrated in the accompanying drawings.

In a first embodiment, a swivel joint system 10 includes a first articulated arm 11 and a second articulated arm 12. The first articulated arm 11 has a locking shell 13, a first bearing shell 14 and a second bearing shell 15. The second articulated arm 12 has an end section 16 with a bush bearing 17. The bush bearing 17 is disposed between the first and second bearing shells 14-15 and has a first counter bearing shell 18 that interacts with the first bearing shell 14 and a second counter bearing shell 19 that interacts with the second bearing shell 15. The swivel joint system 10 also includes a locking pin 20 with a proximal end section 21 and a distal end section 22, and a swiveling connection for the two articulated arms.

The locking pin 20 passes through the first bearing shell 14, the bush bearing 17 and the second bearing shell 15 and is fixed at least axially in the locking shell 13. Because the first and second bearing shells 14-15 are spaced out in the axial direction along the axial length of the bush bearing 17, the swivel joint system 10 provides a two-point radial support due to its construction where the first articulated arm 11 is placed in a position for swiveling radially relative to the second articulated arm 12 due to the two axial shells. The axial shells are offset from each other in the axial direction by the first support and counter support surfaces and by the second bearing and counter bearing shells, 15, 19. This two-point radial positioning reduces the radial play of the mirror arm relative to the base part. The reduction in the radial play is greater the greater the axial distance between the interacting first bearing and counter bearing shells 14, 18 and the interacting second bearing and counter bearing shells 15, 19. An advantage of the swivel joint system 10 is that there is only one axially fixed locking pin 20 that passes through the first bearing shell 14, the bush bearing 17 and the second bearing shell 15. The design with only one locking pin 20 makes it easier and quicker to mount in comparison to conventional designs with two locking pins.

The two-point support design of the swivel joint allows the swivel joint system 10 to be very stiff and have beneficial vibration properties. The vibrations meant here are those that occur during the driving of a vehicle 23. The vibration frequency results from the engine speed or from the contact of the rolling wheels with the road. The two-point support renders the swivel joint system 10 stable and stiff with respect to such vibrations.

The swivel joint system 10 can be used to attach a swiveling mirror to the vehicle 23. In this application, the high level of stiffness, stability and lack of play achieved in the swivel joint system 10, together with the second articulated arm 12 that is hinged to the first articulated arm 11 attached to the vehicle 23 allows for a wide reach. The swivel joint system 10 provides a long length for the hinged articulated arm and a large amount of space between the mirror carried on the distal section of the second articulated arm 12 and the vehicle's exterior wall. The large reach that is possible makes the swivel joint system 10 especially well suited for use on trucks where the driver's cab is frequently narrower than the trailer behind. The long reach of the swivel joint system on the side of the driver's cab bridges this difference in widths and provides a view of the trailer behind the cab in the reverse direction (backward) via the mirror.

The high level of stiffness, stability and play in the swivel joint system also allows the swivel joint system to carry heavy mirrors and heavy mirror systems with large mirror surfaces and/or additional elements integrated into the mirror system, such as white lights, blinking lights, mirror adjustment options, additional mirrors or antennae. Significant parts of the swivel joint system, including the first and second articulated arms 11-12 and the locking pin 20, can be made of plastic. This and the avoidance of typical screws resulting from metal allow for high resistance to corrosion.

The locking pin 20 has a proximal end section 21, a distal end section 22, a pin head 24 on the proximal end section and a pin shaft 25 extending in the direction of the distal end section 22. Furthermore, the locking pin 20 can have a ring collar 26 at the transition from the pin head 24 to the pin shaft 25. The ring collar 26 preferably has a conical shape. The pin head 24 and the conical ring collar 26 are used to center the locking pin 20 in an axial position.

The pin shaft 25 can have a conical shape and taper off toward the distal end section 22. Alternatively, the pin head 24 can be designed conically and taper off toward the distal end section 22. In particular, the pin head 24 can have a conical first pin head section 27 and a conical second pin head section 28 placed distally with respect to the first pin head section 27 such that first and second pin head sections 27-28 taper off in the direction of the distal end section 22. The conical shape of the pin shaft 25 and/or the pin head 24 cause a more stable radial centering of the bearing shells and the bush bearing 17 and reduce or eliminate their radial play if complementary contact surfaces or bearing collars are designed axially section-by-section in the first and second bearing shells 14-15 or in the first and second end sections of the bush bearing 17.

The locking pin 20 can be formed with a hollow inside. It is possible to insert an electric cable 29 in the hollow space for electricity and/or controlling additional components carried by the hinged articulated arm. The locking pin 20 can also be solid and formed massively. The massive design gives the locking pin 20 for the swivel joint system 10 even more stability.

The first bearing shell 14 has an initial bearing that interacts with a first locking pin girthed surface shell 30. The first locking pin girthed surface shell 30 is disposed in the area of the distal end section 22 of the locking pin 20. Accordingly, the locking pin 20 in the area of the first locking pin girthed surface shell 30 is centered, positioned in particular radially, with respect to the first bearing 32. The centering and possibly radial positioning of the locking pin 20 in the area of the first locking pin girthed surface shell 30 reduces or largely eliminates the radial play between the locking pin 20 and the first bearing shell 14.

The second bearing shell 15 has a second bearing 33 that interacts with a second locking pin girthed surface shell 31. The second locking pin girthed surface shell 31 is disposed in the area of the proximal end section 21 of the locking pin 20, particularly on the pin head 24 or in axial proximity to the pin head 24 on the pin shaft 25 of the locking pin 20. As a result, the locking pin 20 in the area of the second locking pin girthed surface shell 31 is centered, positioned in particular radially, with respect to the second bearing 33. The locking pin 20 is coaxially centered in the second bearing 33 by the second locking pin girthed surface shell 31 fitting into the second bearing 33. The centering and possibly radial positioning of the locking pin 20 in the area of the second locking pin girthed surface shell 31 reduces or largely eliminates the radial play between the locking pin 20 and the first bearing shell 14.

The first counter bearing shell 18 can have a third bearing 34 that interacts with a third locking pin girthed surface shell 35. The third locking pin girthed surface shell 35 is disposed axially between the first and second bearing shells 14-15 in the area of the distal end section 22 of the locking pin 20, e.g., in a distal partial section of the pin shaft 25. The cylindrical surface of the third locking pin girthed surface shell 35 slides inside the hole in the first counter bearing shell 18 formed by the third bearing 34 as the second articulated arm 12 rotates about the joint axis 54 with respect to the first articulated arm 11. As a result, the locking pin 20 in the area of the third locking pin girthed surface shell 35 is radially centered with respect to the third bearing 34. The radial centering of the locking pin 20 in the area of the third locking pin girthed surface shell 35 reduces or largely eliminates the radial play between the locking pin 20 and the first end section of the bush bearing 17.

The second counter bearing shell 19 can have a fourth bearing 36 that interacts with a fourth locking pin girthed surface shell 37. The fourth locking pin girthed surface shell 37 is disposed axially between the first and second bearing shells 14-15 in the area of the proximal end section 21 of the locking pin 20, e.g., in a distal shell of the pin head 24 and in axial proximity to the pin head 24 on the pin shaft 25. As a result, the locking pin 20 in the area of this fourth locking pin girthed surface shell 37 is radially centered with respect to the fourth bearing 36. The radial centering of the locking pin 20 in the area of the fourth locking pin girthed surface shell 37 reduces or largely eliminates the radial play between the locking pin 20 and the second end section of the bush bearing 17.

A compensation of measurement tolerances between the first and second articulated arms 11-12 and the locking pin 20 can be achieved if the locking pin 20 has an overlay coating that covers the exterior surfaces of the pin head 24 and the pin shaft 25. The overlay coating is formed as a smooth layer such as Teflon. The smooth layer of the overlay coating causes the friction between the locking pin 20 and the radially centering bearings to decrease. If the overlay coating also has softness and elasticity greater than the softness and elasticity of the section of the locking pin 20 covered by the overlay coating, the overlay coating can be pressed together in the areas of the first, second, third and/or fourth locking pin girthed surface shells and thus compensate for measured tolerances.

The connection between the locking pin 20 and the locking shell 13 can be formed as a bayonet connection, a quick-lock connection, a snap-lock connection or a splint connection. The connection can be positioned between the locking pin 20 and the locking shell 13 in the first bearing shell 14 or in the second bearing shell 15 of the first articulated arm 11.

If a locking shell 13 is positioned in the first bearing shell 14, the distal end section 22 of the locking pin 20 can be locked via a first bayonet connection 38 in the first bearing shell 14. Alternatively, the distal end section 22 of the locking pin 20 can be locked with a snap-lock connection, a splint connection by using a splint or a quick-lock connection, or a quick-lock ring disc in the first bearing shell 14. The locking prevents any axial shifting of the locking pin 20 in the direction of its proximal end section 21. Through this locking on its distal end section 22, the locking pin 20 is secured in the swivel joint system 10 and cannot be lost.

If an additional locking shell is positioned in the second bearing shell 15, the pin head 24 at the proximal end section 21 of the locking pin 20 can be locked via a second bayonet connection 39 in the second bearing shell 15. Alternatively, the pin head 24 can be locked with a snap-lock connection, a splint connection using a splint or a quick-lock connection, or a quick-lock ring disc in the second bearing shell 15. The locking on the proximal end section 21 prevents any axial shifting of the locking pin 20 in its proximal direction, secures the locking pin 20 in the swivel joint system, and holds the locking pin 20 so that it will not be lost.

The second articulated arm 12 can be biased in the axial direction against the first articulated arm 11 using a spring element 40 with a first end 41 and a second end 42. To achieve this tensing, the swivel joint system 10 includes the spring element 40 disposed in the second articulated arm 12 in the area of the first counter bearing shell 18. The second end 42 of the spring element 40 rests on a support surface formed on the locking pin 20. The support surface is disposed at the proximal end section 21 of the locking pin 20, e.g., on the pin head 24 or on the pin shaft 25 in the vicinity of the pin head 24 or on the ring collar 26 at the transition between the pin head 24 and the pin shaft 25. The spring element 40 is penetrated by the pin shaft 25 of the locking pin 20. A sliding element, for example made of Teflon, can be placed between the respective end of the spring element 40 and an interacting support surface. The spring element 40 can be a coil spring, a disc spring or a number (stack) of disc springs. Pre-tensing reduces or eliminates any axial play between the first and second articulated arms 11-12.

The first bush bearing can have a conical inner or outer surface, and the first end section of the bush bearing 17 may have a complementary, conical outer or inner surface. These conical surfaces interact such that the first end section is positioned radially and axially mostly without play through pre-tensing on the first bearing shell 14. This pressure is reinforced by pre-tensing. For this purpose, in an axial cross-section, the first bearing shell 14 can also have the form of a co-axial cup, and the first end section of the bush bearing 17 can have the form of a complementary, co-axial cup.

The swivel joint system 10 can also include a centering element 43 that has an opening 44 penetrated by the pin shaft 25 and a peripheral outer surface 45 that can have an effect as a centering surface with respect to the fourth bearing 36. The peripheral exterior surface 45 of the centering element 43 is pressed against the fourth bearing 36 of the second counter bearing shell 19 so as to center the locking pin 20 radially with respect to the second counter bearing shell 19. Accordingly, the locking pin 20 is radially centered with respect to the second counter bearing shell 19. Alternatively, the swivel joint system 10 includes a centering element 43 that has an opening 44 penetrated by the pin shaft 25 and a peripheral outer surface 45 used as a centering surface with respect to the second bearing 33. Accordingly, the locking pin 20 is radially centered relative to the second bearing shell 15. An overlay coating of the centering element 43 can be used to balance the measured tolerances between the first and second articulated arms 11-12 and the locking pin 20.

A conical ring collar 26 can be formed on the locking pin 20 at the transition from the pin shaft 25 to the pin head 24. A centering element 43 is placed between the second end 42 of the spring element 40 and the conical ring collar 26. Furthermore, the centering element 43 spreads out radially under the pressure of the elastic force of the spring element 40 on the conical ring collar 26, which has an axial force in the direction of the pin head 24 and consequently its peripheral outer surface 45 can be pressed onto the second bearing 33 or onto the fourth bearing 36.

The centering element 43 can be formed as follows:

(A) The peripheral outer surface 45 of the centering element 43 can be a surface that circumferentially surrounds the element. The centering element 43 can be a ring such as an O-ring or a ring disc.

(B) The centering element 43 can have a slit 46 extending in the radial direction that feeds into the opening 44 in its radial inner end and is open at its radial outer end. The peripheral outer surface 45 can be a surface surrounding it in the circumferential direction with the exception of the open section due to the slit 46.

(C) The peripheral outer surface 45 of the centering element 43 can include at least two, preferably three, girthed surface segments offset in the circumferential direction and equally distributed. These girthed surface segments can be radially outer cylindrical wall segments 47.

The centering element 43 can include the following at its end facing the conical ring collar 26:

(i) A chamfer 48 or wedge-shaped profile in a radial section around the opening 44 in the circumferential direction either completely or with a break, although the chamfer 48 or profile can have an inclination angle 49 in the radial direction with regard to the swivel axis. The inclination angle 49 can correspond to a cone angle 50 of the conical ring collar 26.

(ii) At least two, preferably three, circular-segment-shaped chamfers or end surfaces coaxially centered and equally distributed, with an inclination angle 49 in the radial direction with respect to the swivel axis. The inclination angle 49 corresponds to a cone angle 50 of the conical ring collar 26.

(iii) A number of nubs or end surfaces that are placed at radial intervals in the circumferential direction. The end surfaces with different radii or distances to an axis of the centering element 43 are staggered in the axial direction. The axial misalignment can be made smaller for end surfaces with smaller radii or larger for end surfaces with larger radii, and may interact with the end surfaces of the centering element 43 in particular in accordance with the cone angle 50 of the cone-shaped ring collar 26 of the locking pin 20. At least a portion of the end surfaces can be axially centered in a circular shape or in a circular segment form.

In the forms (A), (B) and (C) as well as in the forms (i), (ii) and (iii), the centering element 43 can be one piece and/or be produced out of an elastic material.

The first and the second articulated arms 11-12 can be produced out of plastic or pressure casting. The locking pin 20 can also be produced out of plastic, particularly by means of a pressure casting process. The centering element 43 can be produced out of an elastic material such as rubber or plastic and can be shaped in a pressure casting process. If the aforementioned components of the swivel joint system, such as the first and second articulated arms 11-12, the locking pin 20 and the centering element 43, are made of plastic, the swivel joint system is inexpensive to produce and largely protected against corrosion.

As an alternative to production out of plastic, the locking pin 20 can be manufactured from a metal or metal alloy, such as brass or another metal material. Such a locking pin 20 gives the swivel joint system 10 particular stability and torsional rigidity. The centering element 43 can also be manufactured from metal, a metal alloy such as brass or another metal material.

The swivel joint system 10 can be built as a friction joint. In the design as a friction joint, the first bearing shell 14 has a first friction surface that is conical, round and/or cup-shaped with respect to the swivel axis in the axial cross-sectional profile in the form of a largely even and mainly symmetrical trapezoid with regard to the swivel axis. The friction joint has a minimum of three sectionally radial-running crosspieces evenly staggered in the circumferential direction and is either wave shaped or mainly flat and mainly vertical to the swivel axle. The first counter bearing shell 18 of the bush bearing 17 can have a second friction surface that is at least sectionally complementary to the first friction surface and that interacts with the first friction surface. The strength of the friction resulting from the relative swiveling of the first and second articulated arms 11-12 is determined by the strength of the pretensing caused by the spring element 40 and the form of the surface, including the grinding, polishing or application of a sliding layer or a braking layer, of the frictional surfaces.

Alternatively, the swivel joint system is a latching hinge joint. In the first variant of the latching hinge joint, the first bearing shell 14 has a first latching surface 51 designed at least in sections mainly perpendicular to the joint axis. The first counter bearing shell 18 of the bush bearing 17 has a second latching surface 52 at least in sections mainly perpendicular to the joint axis. The second latching surface 52 is complementary to the first latching surface 51 and interacts with it. Surface 52 contacts and presses against surface 51. In the second variant of the latching hinge joint, a girthed surface shell of the bush bearing 17 has a first latching surface 51. The first articulated arm 11 has a surface shell between the first and second bearing shells 14-15, and the surface shell has a second latching surface 52. The second latching surface 52 is complementary to the first latching surface 51 and interacts with it. The strength of the pressure of the latching with respect to the relative swiveling between the first and the second articulated arms 11-12 is determined by the strength of the pretensioning by the spring element 40 and the form of the lock-in gates of the latching surfaces, for example, the latching depth and the inclination angle 49 for the latching.

A second embodiment of the invention includes a mirror holder for attaching a mirror to the vehicle 23. The mirror holder has a swivel joint system in accordance with the first embodiment. A third embodiment involves the arrangement of the mirror with a mirror head and a mirror holder in accordance with the second embodiment.

By using the swivel joint system 10 to attach a mirror to a vehicle 23, the first articulated arm 11 can be the articulated arm that is attached to the vehicle, and the second articulated arm 12 can have a mirror-holding section that is opposite the end section 16. Alternatively, the second articulated arm 12 can be the articulated arm attached to the vehicle 23, and the first articulated arm 11 can have a mirror carrying section that is on the end that is opposite the end with the first and second bearing shells 14-15 forming the joint connection.

In both cases, the mirror can be swivelled with regard to the mirror carrying section. Furthermore, the swivel joint system in both cases can be assembled on the vehicle 23 such that the first bearing shell 14 is disposed above the second bearing shell 15 or alternatively the second bearing shell 15 is disposed above the first bearing shell 14. In both cases, a carrier arm section or alternatively two carrier arm sections that run mostly parallel to each other, can be formed on the articulated arm carrying the mirror between the end forming the joint connection and the mirror carrying section. In the form with two carrier arm sections, a wind passage opening 53 improves the aerodynamic properties (e.g., wind resistance) and/or the appearance of the mirror-carrying articulated arm between the two carrier arm sections.

Figure 3:
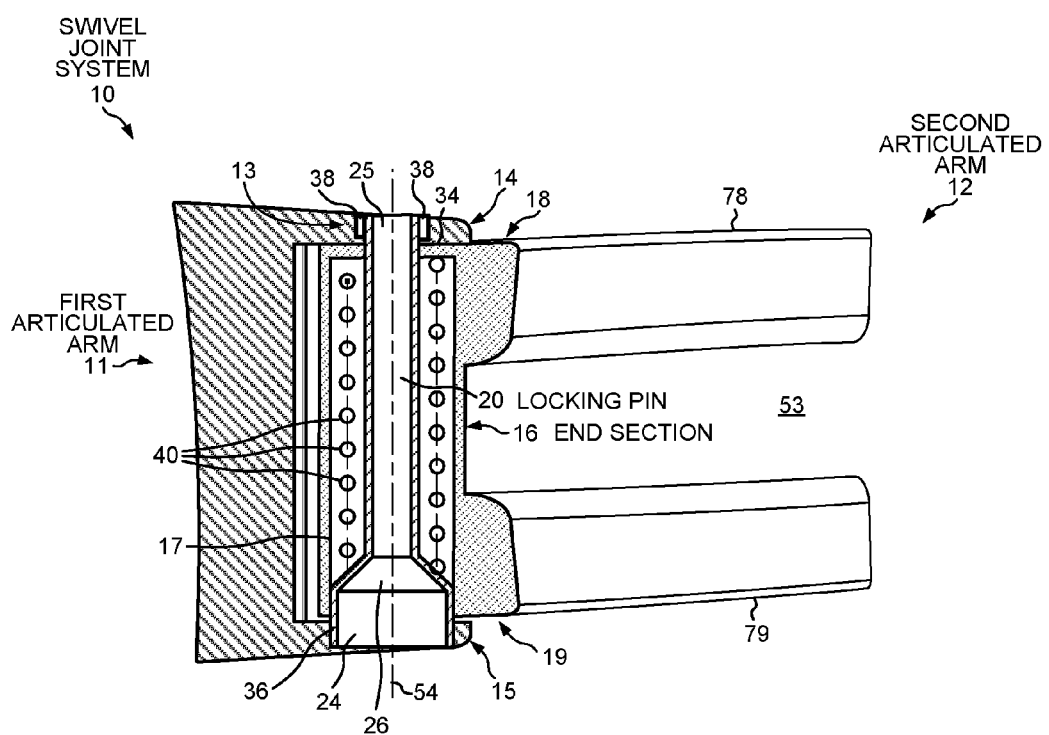
FIG. 3 is a view with a partial cross-sectional view of the swivel joint system of FIG. 1 in the direction of FIG. 1, although the first articulated arm and an area of the second articulated arm are cut off at the level of the joint axis.
Figure 4:
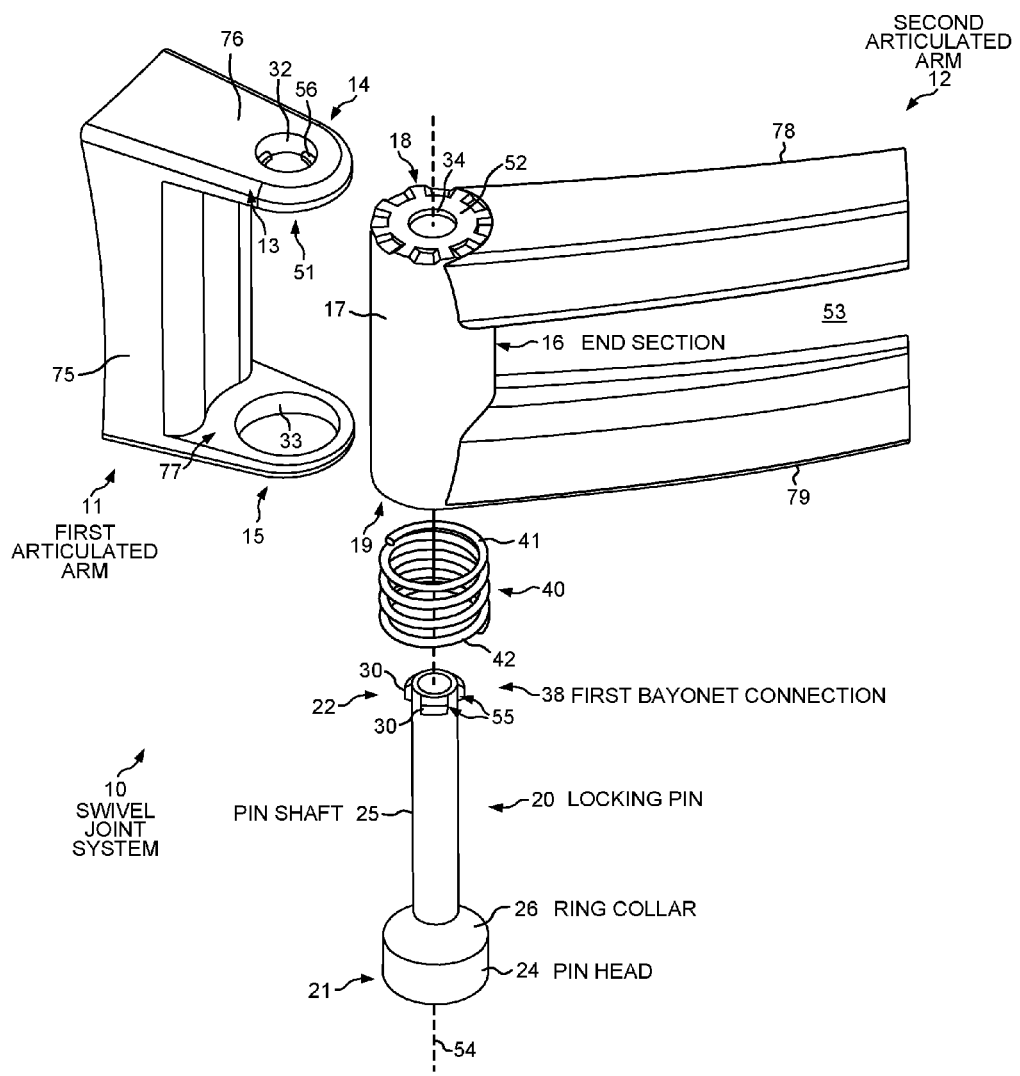
FIG. 4 is an enlarged representation of the swivel joint system of FIG. 3.

FIGS. 1-4 show a first embodiment of the swivel joint system 10 that can be used to attach a mirror to a vehicle 23 in a swiveling manner. Swivel joint system 10 includes the first articulated arm 11 and the second articulated arm 12, which can carry a mirror. First articulated arm 11 is attached to the vehicle 23 and includes a locking shell 13 and first and second bearing shells 14-15. Second articulated arm 12 has an end section 16 connected through a swivel joint to the first articulated arm 11. The swivel joint includes a bush bearing 17 with first and second counter bearing shells 18-19 positioned between the first and a second bearing shells 14-15. The swivel joint also includes a locking pin 20 as shown in FIGS. 3-4. Locking pin 20 has a proximal end section 21 and a distal end section 22 and is used for the swivel connection of the two articulated arms 11-12. The bearing shells 14-15 of the first articulated arm 11 together define a joint axis 54 of the swivel joint. The counter bearing shells 18-19 of the second articulated arm 12 are positioned between the bearing shells 14-15. The first counter bearing shell 18 of the second articulated arm 12 interacts with the first bearing shell 14 of the first articulated arm 11. The second counter bearing shell 19 of the second articulated arm 12 interacts with the second bearing shell 15 of the first articulated arm 11. The locking pin 20 is oriented co-axially to the joint axis 54 and penetrates the first bearing shell 14, the bush bearing 17 with the first and second counter bearing shell 18-19 and the second bearing shell 15.

The locking pin 20 has a pin head 24 with an enlarged diameter designed on the proximal end section 21 of pin 20. Pin 20 also has a pin shaft 25 extending from the pin head 24 to its distal end section 22 and a ring collar 26 at the transition from the pin head 24 to the pin shaft 25. In the examples of the design shown in FIGS. 1-6 and 8, the ring collar 26 is conical and tapers off in the direction of the distal end section 22 for reasons that will be described in more detail below.

The first bearing shell 14 has a first bearing 32 that is coaxial to the joint axis 54 and interacts with a first locking pin girthed surface shell 30 formed at the distal end section 22 of the locking pin 20. Accordingly, the locking pin 20 is centered in the area of this first locking pin girthed surface shell 30 with regard to the first bearing 32 and positioned radially depending on the form of the first locking pin girthed surface shell 30. The second bearing shell 15 has a second bearing 33. This second bearing 33 is coaxial to the joint axis 54 and interacts with a second locking pin girthed surface shell 31 located at the proximal end section 21 of the locking pin 20. Accordingly, the locking pin 20 is centered in the area of this second locking pin girthed surface shell 31 with regard to the second bearing 33 and oriented radially depending on the form of the second locking pin girthed surface shell 31.

The first counter bearing shell 18 has a third bearing 34. Third bearing 34 interacts with a third locking pin girthed surface shell 35 that is positioned axially between the first and second bearing shells 14-15 and between the first and second locking pin girthed surface shells 30-31 in the area of the distal end section 22 of the locking pin 20. The locking pin 20 and the third bearing 34 in the area of the third locking pin girthed surface shell 35 are centered with respect to each other. Furthermore, a fourth bearing 36 is in the second counter bearing shell 19. Fourth bearing 36 interacts with a fourth locking pin girthed surface shell 37 that is positioned axially between the first and second bearing shells 14-15 and between the first and second locking pin girthed surface shells 30-31 at the proximal end section 21 of the locking pin 20. The locking pin 20 and the fourth bearing 36 in the area of the fourth locking pin girthed surface shell 37 are centered with respect to each other.

Figure 6:
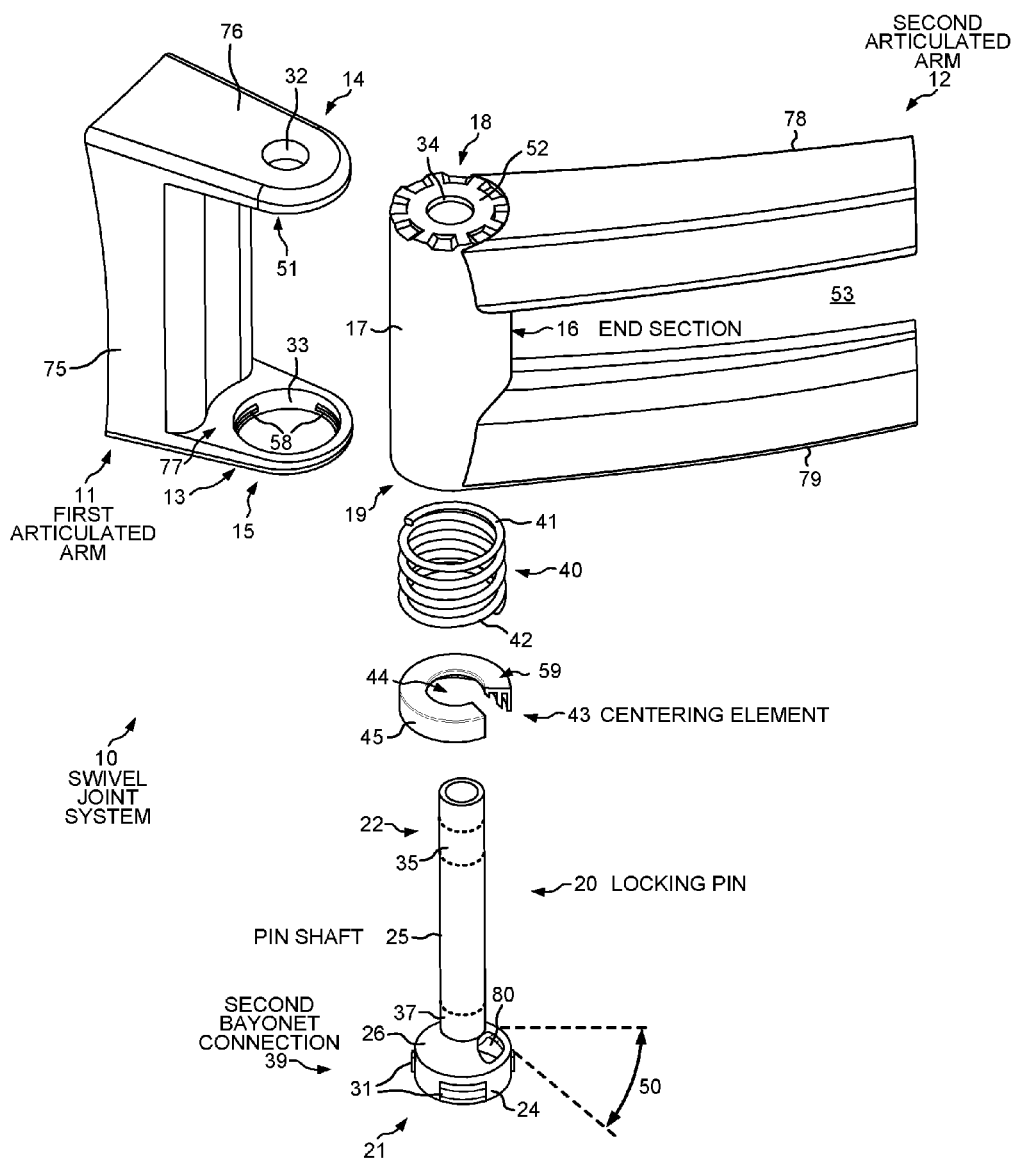
FIG. 6 is an enlarged representation of the swivel joint system of FIG. 5.

As shown in more detail in FIGS. 4 and 6, the locking pin 20 is centered in its distal end section 22 (its first locking pin girthed surface shell 30) in the first bearing shell 14 and in its proximal end shell 21 (its second locking pin girthed surface shell 31 in the second bearing shell 15 and positioned radially, and thus its axis is fixed co-axially with respect to the joint axis 54 on both axially spaced-out shells 30 and 31. Therefore, the first counter bearing shell 18 of the second articulated arm 12 is centered and radially positioned through the interaction of the third bearing 34 with the third locking pin girthed surface shell 35 with respect to the joint axis 54. Accordingly, the second counter bearing shell 19 of the second articulated arm 12 is also centered and radially positioned through the interaction of the fourth bearing 36 with the fourth locking pin girthed surface shell 37 in regard to the joint axis 54. The greater the axial distance between the first and second locking pin girthed surface shells 30-31 or between the first and second bearings 32-33, the more stable the relative fixing of the first articulated arm 11 is in the case of each given radial play with respect to the joint axis 54. Likewise, the greater the axial distance between the third and fourth locking pin girthed surface shells 35 and 37 or between the third and fourth bearings 34, 36, the more stable the relative fixing of the second articulated arm 12 is in the case of each given radial play in regard to the joint axis 54.

The locking pin 20 can be locked into the locking shell 13 of the first articulated arm 11 in the built-in state. The connection and locking between the locking pin 20 and the locking shell 13 can be arranged in the first bearing shell 14 and/or in the second bearing shell 15. The connection between the locking pin 20 and the locking shell 13 can be designed as a bayonet connection, a quick-lock connection, a snap-lock connection or a splint connection. In the first embodiment of FIGS. 1-4, the locking shell 13 is designed into the first bearing shell 14 as a first bayonet connection 38. In the second embodiment of FIGS. 5-6 and in the third embodiment of FIG. 8, the locking shell 13 is placed at the bottom in the second bearing shell 15 and is designed as the second bayonet connection 39.

FIGS. 3-4 show that swivel joint system 10 also has a spring element 40. Spring 40 is used to pre-tense the second articulated arm 12 axially in the direction away from the second bearing shell 15 to the first bearing shell 14 against the first articulated arm 11. Thus, the spring element 40 pushes the locking pin 20 away from the first counter bearing shell 18 of the bush bearing 17. The spring element 40 has a first end 41 and a second end 42 and is designed as a coil spring so that it can be slid onto the pin shaft 25 and is penetrated by the pin shaft 25 once it has been slid on. As shown in FIGS. 3-4, the spring element 40 is supported by its second end 42 on the locking pin 20 locked with the first articulated arm 11 on the ring collar 26 designed on the transition from pin shaft 25 to pin head 24. With its first end 41, the spring element 40 is supported on the first counter bearing shell 18 of the second articulated arm 12 and tenses the first counter bearing shell 18 against the first bearing shell 14. As a result, the axial play of the second articulated arm 12 is reduced and mostly eliminated relative to the first articulated arm 11.

In the first, second and third embodiments shown in FIGS. 1-6 and 8, the swivel joint system 10 is depicted as a latching hinge joint. The first bearing shell 14 has a first latching surface 51 (as suggested in FIG. 4) positioned mainly perpendicular to the joint axis 54, and the first counter bearing shell 18 has a second latching surface 52 also oriented perpendicular to the joint axis 54, which is complementary to the first latching surface 51 and interacts with it. The first and second latching surfaces 51-52 have catches positioned in each case in the circumferential direction around the joint axis 54, which have slanted lateral surfaces in the circumferential direction, and latching recesses that have slanted side surfaces in the circumferential direction that complement the latching surfaces. In FIG. 4, only the second latching surface 52 can be seen, while the first latching surface 51 is suggested by the reference numeral. Due to the complementary formation and under the pretensing of the first counter bearing section 18, effected by the spring element 40 pushing against the first bearing section 14, the catches of the second latching surface 52 engage in the latching recesses of the first latching surface 51 and the catches of the first latching surface 51 engage in the latching recesses of the second latching surface 52. In this form of a latching hinge joint, the second articulated arm 12 can be swivelled relative to the first articulated arm 11 about the joint axis 54, although during the swiveling movement the catches are removed from the complementary latching recesses. The bush bearings 17 of the second articulated arm 12 are temporarily offset opposite the effective direction of the pretensing effected by the spring element 40 (i.e., axially in the direction from the first bearing shell 14 to the second bearing shell 15) according to the axial height of the catches or depths of the latching recesses, until at the end of the swiveling movement the catches on latching positions offset in the circumferential direction engage (lock) in the staggered latching recesses, and the bearing 17 is pressed back into its original axial position under the pretensing effected by the spring element 40 in the direction of the pretensing (i.e., axially in the direction from the second bearing shell 15 to the first bearing shell 14).

The locking pin 20 shown in the first embodiment of FIGS. 1-4 is locked by means of the first bayonet connection 38 into the locking shell 13 placed in the first bearing shell 14 of the first articulated arm 11. In the embodiment of FIG. 4, the first bayonet connection 38 has three first bayonet extensions 55 located at the distal end section 22 of the locking pin 20, in each case extending radially outwards and staggered in the circumferential direction. Thus, multiple (in FIG. 4: three) interacting first bayonet collar segments 56 located in the first bearing 32 of the first bearing shell 14 extend radially inwards and are staggered in the circumferential direction.

The embodiment of the swivel joint system 10 shown in FIG. 4 is made as follows. Initially, the coil spring 40 is slid over the pin shaft 25 of the locking pin 20 until the second end 42 of the spring element 40 touches the ring collar 26 on the pin head 24 in the axial direction. Then the bush bearing 17 of the second articulated arm 12 is fed between the first and second bearing shells 14-15 of the first articulated arm 11. The axis of the bush bearing 17 is oriented coaxially to the joint axis 54 of the first articulated arm 11. Then the locking pin 20 with the spring element 40 on it and with its distal end section 22 in front of it is fed through the second bearing shell 15 of the first articulated arm 11, the second counter bearing shell 19 and the first counter bearing shell 18 of the bush bearing 17 of the second articulated arm 12 until it reaches the area of the first bearing shell 14 of the first articulated arm 11. When feeding the distal end section 22 of the locking pin 20 into the first bearing 32, the locking pin 20 is rotated on its axis so that the first bayonet extensions 55 can be slid through and past the first bayonet collar segments 56 of the first bearing 32 in the axial direction. Then the locking pin 20 will continue to be slid until the first bayonet extensions 55 pass the first bayonet collar segments 56. Then the locking pin 20 is rotated around its axis so that the first bayonet extensions 55 come axially behind the first bayonet collar segments 56 and engage with them, resulting in the locking of the locking pin 20 to the first articulated arm 11. The corresponding undercuts of the bayonet extensions 55 and the first bayonet collar segments 56 can achieve a rear grip. After engaging, the locking pin 20 cannot be removed or fall out in the direction opposite to the feed-in direction, and is firmly set in its axial position.

The first bayonet extensions 55 have girthed outer surfaces that lie on the inner surface of the first bearing 32. The locking pin 20 is thereby centered in the first bearing 32 by the first locking pin girthed shell 30.

The locking pin 20 can be locked or set with the first articulated arm 11 and with the second articulated arm 12 in the axial direction. In both of the embodiments of FIGS. 1-4 and FIGS. 5-6, the locking pin 20 is locked with the first articulated arm 11. After the distal end section 22 of the locking pin has been fed though the shells (15, 19, 18, 14) as described above, and after activation of the locking, the locking pin 20 is prevented from being drawn out or falling out in the opposite direction and is fixed in its axial position. The axial locking of the locking pin 20 can be designed according to one of the following forms.

The second embodiment of the swivel joint system 10 shown in FIGS. 5-6 differs from that of FIGS. 1-4 in the following aspects. First, the locking shell 13 of the first articulated arm 11 is now positioned below in the area of the second bearing shell 15 and the second bearing 33. The second embodiment does not use the first bayonet connection 38 showed in FIGS. 3-4 that functions between the distal end section 22 of the pin shaft 26 and the first bearing 32 of the first bearing shell 14. Instead, the locking shell 13 employs a second bayonet connection 39 between the area of the pin head 24 at the proximal end section 21 and the second bearing 33 of the second bearing shell 15. Second, the second embodiment of the swivel joint system 10 has a centering element 43 that is not present in the first embodiment. The construction and function of the centering element 43 are described in more detail below.

The second bayonet connection 39 has multiple (in FIG. 6: three) second bayonet extensions 57 located on the pin head 24 at the proximal end section 21 of the locking pin 20 extending radially outwards and staggered in the circumferential direction. Multiple interacting second bayonet collar segments 58 in the second bearing 33 of the second bearing shell 15 extend radially inwards and are staggered in the circumferential direction. The second bayonet extensions 57 work with the second bayonet collar segments 58 in a similar way as the first bayonet extensions 55 do with the first bayonet collar segments 56 in the first embodiment of FIGS. 1-4.

The centering element 43 has a peripheral outer surface 45 and an opening 44 that is penetrated by the pin shaft 25 of the locking pin 20. The peripheral outer surface(s) 45 functions as a centering surface in the second bearing 33 and as a centering surface in the fourth bearing 36 so that the locking pin 20 is centered in the centering element 43 with respect to the second bearing shell 15 and with respect to the second counter bearing shell 19. In the second embodiment, the centering element 43 is positioned axially in the area of the second counter bearing shell 19 and functions as a centering surface with respect to the second bearing 36 as described in more detail below.

In the installed state, the centering element 43 is slid onto the pin shaft 25 and positioned between the second end 42 of the spring element 40 and the cone-shaped ring collar 26 of the locking pin 20. As shown in FIGS. 5 and 7B, the centering element 43 has three coaxially centered circular-segment-shaped chamfers 48 spaced at intervals from each other. FIG. 7B shows that the chamfers 48 have lower end surfaces at an inclination angle 49 with respect to a symmetry axis of the centering element 43, which is coaxial to the joint axis 54. Thus, the lower side of the centering element 43 is adjacent to the conical ring collar 26, and the lower side slants down and away from the pin shaft at the inclination angle 49, which corresponds to the cone angle 50 of the conical ring collar 26 as shown in FIG. 5.

The chamfers 48 rest on the conical ring collar. As the centering element 43 is pressed down into the conical ring collar 26 by the spring element 40, the peripheral outer surface 45 of the centering element 43 is spread outwards in the radial direction and presses against the inner surface of the bush bearing 16 positioned in the area of the second counter bearing shell 19 and thus functions as a centering surface with respect to the second counter shell 19 and centers the locking pin 20.

This centering is supported by the pretensing brought about by the spring element. The second end 42 of the spring element 40 is supported on the cone-shaped ring collar 26 by the centering element 43 placed between them, and presses the centering element 43 towards the proximal end section 21 of the locking pin 20 (in FIG. 5 towards the bottom) against the conical ring collar 26 due to the pretensing. The interaction between the elastic force (pretensing) of the spring element 40 with the conical ring collar 26 lets the centering element 43 spread out radially over the conical ring collar 26 so that its peripheral outer surface 45 is pressed against the inner surface of the second counter bearing shell 19 of the bush bearing 17 and is centered in this way on the locking pin 20 with respect to the counter bearing shell 19. The centering element 43 is intended to compensate for radial differences in size or different dimensional tolerances of the locking pin 20 (particularly the pin head 24) in regard to the dimensions of the second counter bearing shell 19 of the second articulated arm 12.

Figure 5:
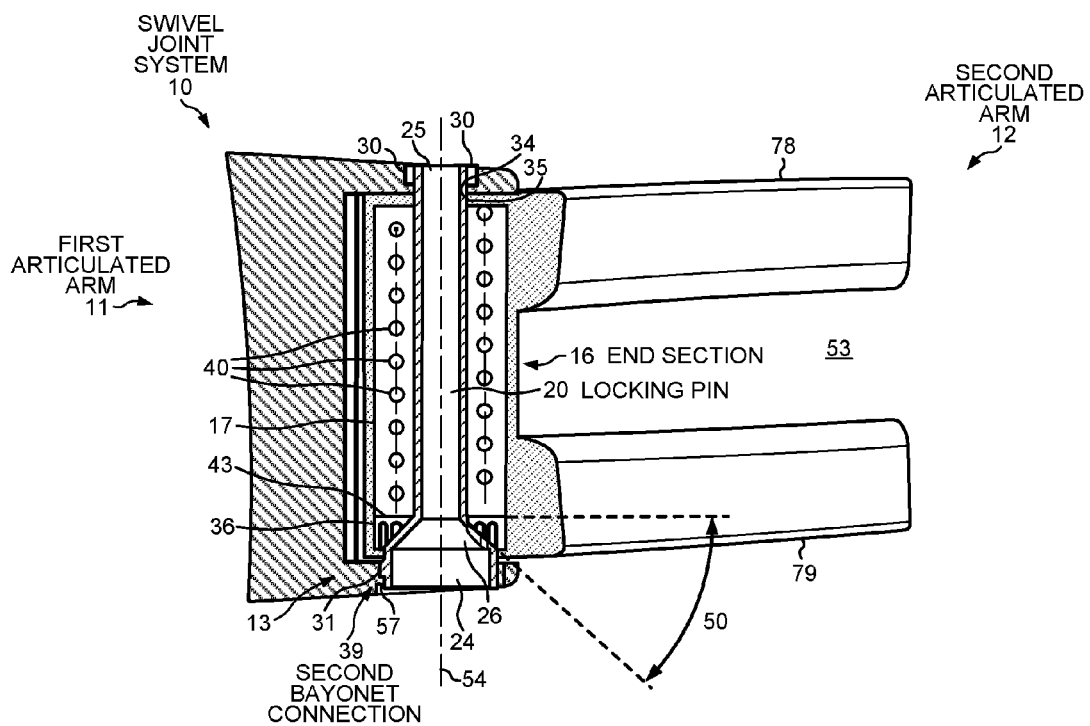
FIG. 5 is a view with a partially cross-sectional figure, analogous to FIG. 4, of a second example of a design of the swivel joint system.

In addition to the form of the centering element 43 shown in FIGS. 5-6, other forms of the centering element 43 are also conceivable so long as they include an opening 44 that can be penetrated by the pin shaft 25, an application surface 59 that surrounds the opening to support the second end 42 of the spring element 40, and a peripheral outer surface 45 that can press against the inner surface of the second bearing shell 15 or the second counter bearing shell 19 and has the elastic properties to be spread out on the conical ring collar 26 of the locking pin 20 under the axial application of force (through the spring element 40, as described). The spring element 40 is compressed between the first counter bearing shell 18 and the contact surface 59. The centering element 43 spreads out radially when pressed by the spring element 40 onto the conical ring collar 26. FIGS. 7A-7D show examples of various designs of the centering element 43.

Figure 7A:
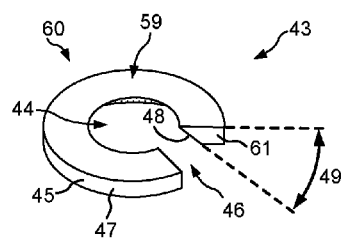
FIGS. 7A-D show different forms of a centering element that can be built into the swivel joint system according to the invention.
Figure 7B:
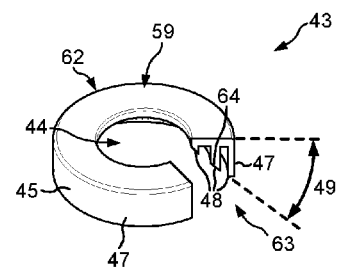

In the form showed in FIG. 7A, the centering element 43 is a ring disc 60 with an opening 44 that can be penetrated by the pin shaft 25. Ring disc 60 has a radially extending slit 46 through which it can be spread out radially. Ring disc 60 has a single chamfer 48 with a lower surface that is inclined at the inclination angle 49 that corresponds to the cone angle 50 of the conical ring collar 26. The angle of the inclined lower surface is apparent from end surface 61, which shows the cross section of ring disc 60.

FIG. 7B shows the design of centering element 43 included in the swivel joint system 10 of FIGS. 5-6. The centering element 43 is a ring disc 62 with an opening 44 that can be penetrated by the pin shaft 25, an exterior cylindrical wall segment 47 and a radially extending slit 63. Wall segment 47 extends from the circular edge section of the ring disc 62 in the axial direction such that its outer surface 45 presses against and forms the centering surface with respect to the second bearing 34 and/or the fourth bearing 36 when the centering element 43 is spread out. The centering element 43 also includes an inner cylinder wall segment 64 that is concentrically centered between the opening 44 and the outer cylinder wall segment 47. The difference in how far the inner and outer cylindrical wall segments 64, 47 extend downwards forms a profile that has the inclination angle 49 corresponding to the cone angle 50 of the conical ring collar 26 of the locking pin 20. The bottoms of the inner and outer cylindrical walls 64, 47 interact with the conical ring collar 26 when spread out.

Figure 7C:
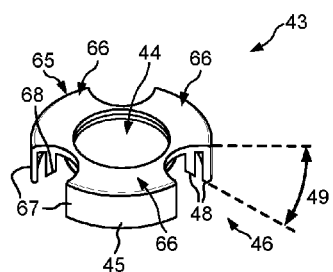

FIG. 7C shows another design of the centering element 43 in which a circular ring disc 65 surrounds the opening 44 that can be penetrated by the pin shaft 25 of the locking pin 20. Circular ring disc 65 has at least two (here preferably: three) tongues 66 extending out radially from the circular ring disc 65 and at least two (here: three) outer cylindrical wall segments 67 associated with the tongues 66 and that extend from their respective tongues in an axial direction. The girthed outer surfaces 45 of the cylindrical wall segments 67 form the centering surfaces with respect to the second and/or fourth bearings 33, 36 in the inserted and spread-out state of the centering element 43. Similar to the form of the design of FIG. 7B, the centering element 43 of FIG. 7C includes an inner cylindrical wall segment 68 inside the outer cylindrical wall segment 67. The inner cylindrical wall segment 68 is concentrically centered inside the outer cylindrical wall segment 67 and extends downward from each tongue 66 in the same axial direction, but not as far as the outer cylindrical wall segment 67 extends downward. The difference in the downward axial length of the inner and outer cylindrical wall segments 68, 67 forms a profile that has an inclination angle 49 that approximately corresponds to the cone angle 50 of the conical ring collar 26 of the locking pin 20 and interacts with the conical ring collar 26 when spread out.

Figure 7D:
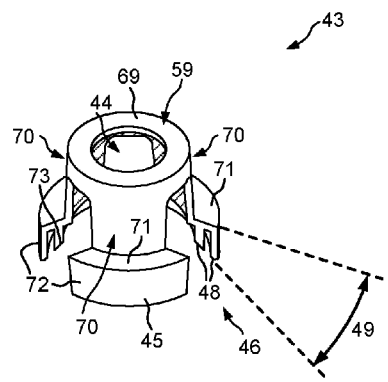

FIG. 7D shows yet another design of the centering element 43 in which a circular ring section 69 surrounds the opening 44 that can be penetrated by the pin shaft 25. Circular ring section 69 has at least two (here: three) tube wall segments 70 that extend from the periphery of the circular ring section 69 in the axial direction and at least two (here: three) cylindrical ring segments 71 associated with the tube wall segments 70. The cylindrical ring segments 71 extend from the respective axial sections of the tube wall segments 70 radially outwards. Each of the cylindrical ring segments 71 has an outer cylindrical wall segment 72 that extends downwards from the respective cylindrical ring segment 71. In the inserted and spread-out state of the centering element 43, the outer surface 45 of each outer cylindrical wall segment 72 forms a centering surface with respect to the second and/or fourth bearings 33, 36. Similar to the design of FIGS. 7B-7C, the centering element 43 of FIG. 7D also includes inner cylindrical wall segments 73 concentrically centered inside the outer cylindrical wall segments 72. Each of the inner cylindrical wall segments 73 extends from the cylindrical ring segment 71 downwards in an axial direction, but not as far as the neighboring outer cylindrical wall segment 72. The difference in the downward axial extension of the inner and outer cylindrical wall segments 73, 72 also forms a profile that has an inclination angle 49 that approximately corresponds to the cone angle 50 of the conical ring collar 26 of the locking pin 20 and interacts with the conical ring collar 26 when spread out. The axial extension of the tube wall segments 70 produces an axial offset between the inclination angle 49 over the conical ring collar 26 and the attachment surface 59 of the ring section 69 on which the second end 42 of the spring element 40 rests. This axial offset allows the use of a shorter spring element (coil spring) 40.

In the designs shown in FIGS. 7A-7D, the centering element 43 has one or more at least sectionally circumferential chamfers 48 at the bottom side facing the conical ring collar 26 coaxially centered around the joint axis 54. The circumferential chamfers 48 have an inclination angle 49 that corresponds at least approximately to the cone angle 50 of the conical ring collar 26 of the pin bolt 20.

A method of manufacturing the swivel joint system 10 of FIG. 6 is now described. The swivel joint system 10 includes the first articulated arm 11, the second articulated arm 12, the locking pin 20, the spring element 40, and the centering element 43. First, the centering element 43 and the coil spring 40 are slid over the pin shaft 25 of the locking pin 20 until the second end 42 of the coil spring 40 rests on the attachment surface 59 of the centering element 43 and the profile of the inclination angle 49 at the opposite end of the centering element 43 rests on the ring collar 26 of the pin head 24. Then the bush bearing 17 of the second articulated arm 12 is fed between the first and second bearing shells 14-15 of the first articulated arm 11. The axis of the bush bearing 17 is directed coaxially to the joint axis 54 of the first articulated arm 11. Then the locking pin 20 with the centering element 43 and the spring element 40 on it is fed from the distal end section 22 through the second bearing shell 15 of the first articulated arm 11, the second counter bearing shell 19, and the first counter bearing shell 18 of the bush bearing 17 until the distal end section 22 reaches the area of the first bearing shell 14 of the first articulated arm 11. When the locking pin 20 is inserted, it is rotated on its axis so that the second bayonet extensions 57 on the pin head 24 slide through the second bayonet collar segments 58 of the second bearing 33 in the axial direction. The locking pin 20 is slid farther until the second bayonet extensions 57 pass the second bayonet collar segments 58. Then the locking pin 20 is rotated around its axis so that the second bayonet extensions 57 come axially behind the second bayonet collar segments 58 and engage with them, resulting in the engaging of the locking pin 20 with the first articulated arm 11. The corresponding undercuts of the first bayonet extensions 57 and the first bayonet collar segments 56 can achieve a rear grip. After engaging, the locking pin 20 cannot be removed or fall out in the direction opposite to the feed-in direction, and is firmly set in its axial position.

The second bayonet extensions 57 have girthed outer surfaces that lie on the inner surface of the second bearing 33 and in this way, together, form the second locking pin girthed shell 31 through which the locking pin 20 (more precisely: its proximal end section 21 with the pin head 24) is centered with regard to the second bearing 33.

Figure 8:
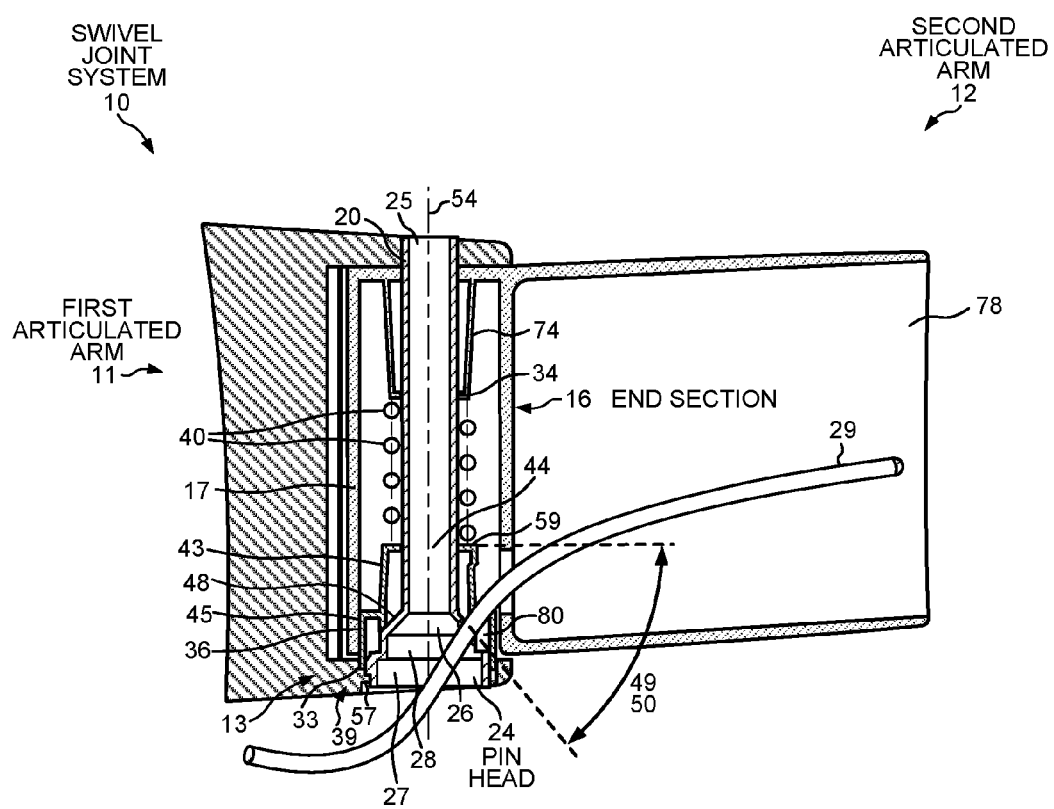
FIG. 8 is a view with a partially cross-sectional figure, analogous to FIG. 4, of a third sample design of the swivel joint system.

FIG. 8 shows a third embodiment of swivel joint system 10. The embodiment of FIG. 8 is similar to the embodiment of FIGS. 5-6 in that the locking shell 13 is positioned at the bottom in the area of the second bearing shell 15 and the second bearing 33. Moreover, in both embodiments, the locking between the pin head 24 of the locking pin 20 and the second bearing 33 is accomplished using the second bayonet connection 39. In addition, the centering element 43 is planned between the second end of the spring element 40 and the conical ring collar 26 of the locking pin 20.

However, the third embodiment of FIG. 8 differs from the second embodiment of FIGS. 5-6 with regard to the shapes of the pin head 24 of the locking pin 20, the centering element 43, the first counter bearing shell 18 and the articulated arm section that connects a mirror carrying section of the second articulated arm 12 to the end section 16 of the second articulated arm 12. These differences in design form and the resulting advantages are described below in more detail.

The pin head 24 of the locking pin 20 of the third embodiment extends axially in the area of the second bearing shell 15 of the first articulated arm 11 and the second counter bearing shell 19 of the second articulated arm 12. This pin head 24 has a first pin head section 27 that is radially expanded and extends into the area of the second bearing shell 15. The pin head 24 also has a second pin head section 28 positioned distally with respect to the first pin head section 27. This second pin head section 28 is tapered radially and extends into the area of the second counter bearing section 19. The transition from the first 27 to the second 28 pin head section has another ring collar (not shown). The transition from the second pin head section 28 to the pin shaft 25 has the cone-shaped ring collar 26 with the cone angle 50, which interacts with the centering element 43 by spreading out radially under the impact of the pretensing produced by the spring element 40 (axial force) as was described for the second embodiment of FIGS. 5-7.

The second bayonet connection 39 works here between the pin head shell 27 and the second bearing shell 15, analogous to the second bayonet connection 39 of the second embodiment, which works between the pin head 24 and the second bearing shell 15.

In a further development of the second embodiment, the first and the second pin head sections 27, 28 and/or the pin shaft 25 are formed conically and taper off (not shown) in the direction of the distal end section 22. Such a conical design of the locking pin 20 simplifies the insertion of the locking pin 20 through the second bearing shell 15, the second counter bearing shell 19, the first counter bearing shell 15 and the first bearing shell 14 in the assembly of the components 11 to 43 of the swivel joint system 10.

The design of the centering element 43 of the third embodiment corresponds to the design shown in FIG. 7D to the extent that the centering element 43 in FIG. 8 has an axial offset between the support surface 59 around the opening 44 for the second end of the spring element 40 and the surface of the conical ring collar 26 of the pin head 24, which has a profile and/or an at least sectionally circumferential chamfer 48 with an inclination angle 49 around the locking pin 20, which corresponds to the cone angle 50 of the conical ring collar 26. As mentioned above, this axial offset allows for the use of a shorter spring element 40 in the axial direction.

The centering element 43 shown in FIG. 8 has peripheral outer surfaces 45 similar to those shown in FIG. 7D. In the installed state of centering element 43, the peripheral outer surfaces 45 do not just extend axially into the area of the second bearing 36 and the second counter bearing shell 19 to act as centering surfaces with respect to the bearings 19, 36, as in the second embodiment of FIGS. 5-6, but the peripheral outer surfaces 45 also extend into the area of the first bearing 33 and the first counter bearing section 15. Thus, the surfaces 45 also act as centering surfaces with respect to the first bearing 33 and the first counter bearing section 15. In the third embodiment, the centering element 43 serves to compensate the radial differences in size and/or different dimensional tolerances of the sizes for the locking pin 20 (particularly the pin head 24) and in regard to the dimensions of the second counter bearing shell 19 of the second articulated arm 12 and to the dimensions of the second bearing shell 15 of the first articulated arm 11.

In the third embodiment, the first counter bearing shell 18 of the bush bearing 17 is designed in sections as a cup 74 coaxially to the joint axis 54. The first counter bearing shell 18 includes the cup-shaped section 74 with a cup edge that is turned to the first bearing shell and a cup floor that is positioned axially inwards and offset in the direction of the second counter bearing shell 19 with respect to the cup edge. The third bearing 34 is designed in the cup floor. On the cup floor, more precisely on the side of the cup floor turned to the second counter bearing shell 19, the support surface is designed for the first end 41 of the spring element 40. The axial extension of the cup-shaped section 74, i.e., the axial offset between the cup edge and the cup floor, allows for the use of a shorter spring element 40 in the axial direction.

The swivel joint system 10 described with reference to FIGS. 1-6 and 8 and in accordance with the first, second and third embodiments produces a swiveling joint connection between a mirror system, such as an exterior mirror that can be carried by one of the two articulated arms 11 or 12, and the vehicle's exterior wall onto which the other of the two articulated arms 12 or 11 is attached. In the swivel joint system 10 shown in FIGS. 1-6 and 8, the first articulated arm 11 is designed for attachment to the vehicle 23, and the second articulated arm is designed for carrying the mirror system. The first articulated arm 11 includes a basic section 75 with a side facing the vehicle 23 and a first end (above in FIGS. 1-6 and 8) and second end (below in FIGS. 1-6 and 8), and a first holding arm 76 extending from the first end in the direction away from the side facing the vehicle 23. The first holding arm 76 has the first bearing shell 14 in its distal section. The first articulated arm 11 also has a second holding arm 77 extending from the second end in the direction away from the side facing the vehicle 23, with the second holding arm 77 having the second bearing shell 15 in its distal section, although the first and the second bearing shells 14-15 are turned to each other and the first and second holding arms 76, 77 encompass the end section 16 of the second articulated arm 12. The second articulated arm 12 includes at one of its ends the end section 16 positioned between the first and the second bearing shells 14-15 and a mirror-carrying section (not showed) that is arranged on the end opposite to the end section 16 and on which the mirror system is positioned and typically mounted relative to the second articulated arm 12 so that it can be swivelled in two vertical directions.

In the third embodiment of FIG. 8, the end section 16 is connected via a single carrier arm section 78 to the mirror carrying section (not showed). In contrast to this, the end section 16 in the first and second embodiments is connected to the mirror-carrying section via two carrier arm sections 78 and 79 that are positioned mainly parallel to each other. Furthermore, a wind passage opening 53 is included between the first and the second carrier arm sections 78-79 to improve the aerodynamics and the aesthetic overall impression of the swivel joint system 10.

In the third embodiment of FIG. 8, a cable 29 passes through the swivel joint system 10 to supply electricity, for example, for use with an electrically adjustable mirror head that is arranged on the end of the second articulated arm 12 opposite to the end section 16, and for transmitting control signals to and from the user. The cable 29 is fed into the proximal end section 21, more precisely into the pin head 24 of the hollowly designed locking pin 20. The cable 29 runs from the user and passes out of the pin head 24 through an opening 80 designed in the ring collar 26 (also showed in FIG. 6) and through the bush bearing 17 and through another opening designed in a wall of the bush bearing 17 (not showed) into the inside of the carrier arm section 78.

LIST OF REFERENCE NUMERALS 10 swivel joint system
11 first articulated arm
12 second articulated arm
13 locking shell
14 first bearing shell
15 second bearing shell
16 end section
17 bush bearing
18 first counter bearing shell
19 second counter bearing shell
20 locking pin
21 proximal end section
22 distal end section
23 vehicle
24 pin head
25 pin shaft
26 ring collar
27 first pin head section
28 second pin head section
29 cable
30 first locking pin girthed surface shell
31 second locking pin girthed surface shell
32 first bearing
33 second bearing
34 third bearing
35 third locking pin girthed surface shell
36 fourth bearing
37 fourth locking pin girthed surface shell
38 first bayonet connection
39 second bayonet connection
40 spring element
41 first end
42 second end
43 centering element
44 opening
45 outer surface
46 slit
47 outer cylindrical wall segment
48 chamfer
49 inclination angle
50 cone angle
51 first latching surface
52 second latching surface
53 wind passage opening
54 joint axis
55 first bayonet extension
56 first bayonet collar segment
57 second bayonet extension
58 second bayonet collar segment
59 contact surface
60 ring disc
61 end surface
62 ring disc
63 slit
64 inner cylindrical wall segment
65 circular ring section
66 tongue
67 outer cylindrical wall segment
68 inner cylindrical wall segment
69 cylindrical ring section
70 tube wall segment
71 cylindrical ring segment
72 outer cylindrical wall segment
73 inner cylindrical wall segment
74 cup-shaped section
75 basic section
76 first holding arm section
77 second holding arm section
78 first carrier arm section
79 second carrier arm section
80 opening Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A swivel joint system for supporting an indirect imaging device on a vehicle, comprising:
a first arm with a first bearing shell, a second bearing shell and a locking shell;
a second arm with a bush bearing, wherein the bush bearing has a first counter bearing shell and a second counter bearing shell, wherein the bush bearing is disposed between the first bearing shell and the second bearing shell, wherein a first latching surface of the first counter bearing shell contacts a second latching surface of the first bearing shell;
a locking pin that passes through the second bearing shell, the bush bearing and the first bearing shell, wherein the locking pin has a ring collar disposed towards a proximal end of the locking pin, wherein the locking pin is oriented co-axially to a joint axis, and wherein the second arm swivels relative to the first arm about the joint axis; and
a coil spring disposed between the ring collar and the first counter bearing shell, wherein the locking pin passes through the coil spring, and wherein the coil spring presses the first counter bearing shell up into the first bearing shell by pushing down against the ring collar such that catches disposed on the second latching surface engage in latching recesses of the first latching surface, wherein bayonet extensions are disposed at a proximal end of the locking pin, wherein bayonet collar segments are disposed in the first bearing shell, and wherein the locking pin is locked to the first arm by the bayonet extensions being slid through the bayonet collar segments and undercuts of the bayonet extensions engaging the bayonet collar segments.

2. The swivel joint system of claim 1, wherein the coil spring pushes the locking pin away from the first counter bearing shell.

3. The swivel joint system of claim 1, further comprising:
a centering element with an opening through which the locking pin passes, wherein a peripheral exterior surface of the centering element presses against a bearing of the second counter bearing shell so as to center the locking pin radially with respect to the second counter bearing shell.

4. The swivel joint system of claim 1, further comprising:
a centering element with an opening through which the locking pin passes, wherein the locking pin has a pin shaft, wherein the ring collar is conical, wherein a lower side of the centering element is adjacent to the conical ring collar, and wherein the lower side slants down and away from the pin shaft at an inclination angle that corresponds to a cone angle of the conical ring collar.

5. A swivel joint system for supporting an indirect imaging device on a vehicle, comprising:
a first arm with a first bearing shell, a second bearing shell and a locking shell:
a second arm with a bush bearing, wherein the bush bearing has a first counter bearing shell and a second counter bearing shell, wherein the bush bearing is disposed between the first bearing shell and the second bearing shell, wherein a first latching surface of the first counter bearing shell contacts a second latching surface of the first bearing shell;
a locking pin that passes through the second bearing shell, the bush bearing and the first bearing shell, wherein the locking pin has a ring collar disposed towards a proximal end of the locking pin, wherein the locking pin is oriented co-axially to a joint axis, and wherein the second arm swivels relative to the first arm about the joint axis;
a coil spring disposed between the ring collar and the first counter bearing shell, wherein the locking pin passes through the coil spring, and wherein the coil spring presses the first counter bearing shell up into the first bearing shell by pushing down against the ring collar such that catches disposed on the second latching surface engage in latching recesses of the first latching surface; and
a centering element with a contact surface, wherein the coil spring is compressed between the first counter bearing shell and the contact surface, wherein the ring collar is conical, wherein the centering element is disposed between the coil spring and the conical ring collar, and wherein the centering element spreads out radially when pressed by the coil spring onto the conical ring collar.

6. The swivel joint system of claim 5, further comprising:
a mirror attached to the second arm.

7. The swivel joint system of claim 5, wherein the first arm is attached to an exterior of a vehicle.

8. The swivel joint system of claim 5, wherein the first bearing shell has a first bearing, wherein a locking pin girthed surface shell is disposed at a distal end of the locking pin, and wherein the locking pin is locked to the first arm by the locking pin girthed surface shell sliding through the first bearing.

9. The swivel joint system of claim 5, wherein the second bearing shell has a second bearing, wherein a locking pin girthed surface shell is disposed at a proximal end of the locking pin, and wherein the locking pin is coaxially centered in the second bearing by the locking pin girthed surface shell fitting into the second bearing.

10. The swivel joint system of claim 5, wherein a locking pin girthed surface of the locking pin slides inside a hole in the first counter bearing shell as the second arm rotates about the joint axis with respect to the first arm.

11. The swivel joint system of claim 5, wherein a locking pin girthed surface towards a proximal end of the locking pin slides inside a hole in the second counter bearing shell as the second arm rotates about the joint axis with respect to the first arm.

12. The swivel joint system of claim 5, wherein the contact surface of the centering element is divided into a plurality of tongues that extend radially outwards, wherein each of the tongues has an associated outer cylindrical wall segment that extends from its associated tongue in an axial direction, and wherein each outer cylindrical wall segment has a peripheral exterior surface that presses against a bearing of the second counter bearing shell.

* * * * *